(12) United States Patent
Guetta et al.

(10) Patent No.: US 12,552,284 B2
(45) Date of Patent: Feb. 17, 2026

(54) SYSTEM AND METHOD FOR REPLACING A BATTERY IN A VEHICLE

(71) Applicant: B.G. NEGEV TECHNOLOGIES & APPLICATIONS LTD. AT BEN-GURION UNIVERSITY, Beer-Sheva (IL)

(72) Inventors: Yoad Guetta, Be'er Sheva (IL); Amir Shapiro, Meitar (IL)

(73) Assignee: B.G. NEGEV TECHNOLOGIES & APPLICATIONS LTD. AT BEN-GURION UNIVERSITY, Beer-Sheva (IL)

( * ) Notice: Subject to any disclaimer, the term of this patent is extended or adjusted under 35 U.S.C. 154(b) by 363 days.

(21) Appl. No.: 18/013,291

(22) PCT Filed: Jun. 28, 2021

(86) PCT No.: PCT/IL2021/050793
§ 371 (c)(1),
(2) Date: Dec. 28, 2022

(87) PCT Pub. No.: WO2022/003680
PCT Pub. Date: Jan. 6, 2022

(65) Prior Publication Data
US 2023/0242005 A1    Aug. 3, 2023

Related U.S. Application Data

(60) Provisional application No. 63/045,123, filed on Jun. 28, 2020.

(51) Int. Cl.
*B60L 53/80*    (2019.01)
*B64F 5/50*    (2017.01)
*H01M 10/42*    (2006.01)
*B64U 80/25*    (2023.01)

(52) U.S. Cl.
CPC ............... *B60L 53/80* (2019.02); *B64F 5/50* (2017.01); *H01M 10/4257* (2013.01); *B60L 2200/10* (2013.01); *B64U 80/25* (2023.01); *H01M 2220/20* (2013.01)

(58) Field of Classification Search
CPC .................................. B60L 53/80; B64F 5/50
See application file for complete search history.

(56) References Cited

U.S. PATENT DOCUMENTS

2014/0360010 A1* 12/2014 Haug ................... B60L 53/65
                                                                29/623.1
2021/0313647 A1* 10/2021 Itai ........................ B60K 1/04
2021/0331601 A1* 10/2021 Yang ..................... B60L 58/10
2022/0393289 A1* 12/2022 Moran ................... B60K 1/04

FOREIGN PATENT DOCUMENTS

CN        110356569        *    7/2019

* cited by examiner

*Primary Examiner* — Erez Gurari
(74) *Attorney, Agent, or Firm* — Nixon & Vanderhye PC (57) ABSTRACT

The subject matter discloses a method for replacing a battery for a first vehicle, comprising a second vehicle placing the battery above the first vehicle; releasing the battery from the second vehicle to an inlet in the first vehicle; carrying the battery in a compartment of the first vehicle; coupling the battery to electronic circuitry in the first vehicle, such that the electronic circuitry receives electronic power from the battery. The subject matter also discloses an aerial vehicle used to receive a replacing battery, and a battery replacement system.

8 Claims, 13 Drawing Sheets

SYSTEM AND METHOD FOR REPLACING A BATTERY IN A VEHICLE

FIELD OF THE INVENTION

The subject matter generally relates to battery replacement technologies, more particularly, to battery replacement without stopping the vehicle's mission.

BACKGROUND OF THE INVENTION

Many vehicles, both aerial vehicle and vehicles driving on roads, have a limited battery life. The battery life limits the travel time, for example flight time or driving time. Known solutions presented for extending the travel time have been divided into two paradigms.

The first is to increase travel time by improving the vehicle's efficiency, for example by optimizing the vehicle's design. In addition, efficiency can be obtained by hybrid systems that generate electricity from liquid fuel or from hydrogen fuel cells for the vehicle's power system. All those approaches ameliorate the problem but does not eliminate it.

The second paradigm is a stationary battery replacement system or recharge system. In the second paradigm, the position of the charging point is very restrictive to the vehicle's route and requires a travel to the charging point. This pattern wasting significant amount of energy from the resources.

SUMMARY OF THE INVENTION

The subject matter discloses a battery replacement method and system that enable replacing a vehicle's battery without stopping the vehicle, either on land or on the air. The subject matter provides a breakthrough in making the energy source replacement without the need to change the travel mission or course. The vehicle can continue to perform its mission without being required to spend its resources for logistics needs such as battery replacement or charging at a defined point.

In some cases, the battery replacement process is performed while maintaining uniform and stable voltage of the vehicle's components. In some cases, the battery replacement process is performed while maintaining mission course. In some cases, the battery replacement process is performed during flight.

In some cases, the battery replacement system comprises an absorption compartment structure that absorbs the battery's cartridge in any orientation in space. In some cases, the cartridge orientation at the absorption compartment by its walls to enter the stack cell.

In some cases, the battery replacement system uses a push-pull arm. In some cases, the battery replacement system comprises angular motor. In some cases, the battery replacement system uses a push-pull arm driven by a servo motor. In some cases, the battery replacement system comprises a set of linear rails for the connector's movement. In some cases, the battery replacement system converts the rotational movement to linear movement of the connector. In some cases, the battery replacement system comprises a gear system for performing the linear motion. In some cases, the battery replacement system comprises a connection mechanism that uses an angular motor.

In some cases, the battery replacement system comprises parallel connection of two or more rigid connectors. In some cases, the mechanism that uses parallel rigid connectors driven by servo.

In some cases, the battery's cartridge enters the compartment in any orientation. In some cases, the battery's cartridge has a symmetrical cartridge structure. In some cases, the battery's cartridge has one or more connectors in each face in symmetrical position and orientation.

In some cases, the battery's cartridge has a symmetrical location of the connector from the cartridge edges. In some cases, the battery's cartridge has a rigid connector. In some cases, the battery's cartridge has a structure comprising a central body and 2 covers.

In some cases, the battery's cartridge has a structure shape capable to be absorbed in any orientation in a compartment. In some cases, the system comprises a command component that routes energy source inputs to outputs. In some cases, the command component is an electrical component. In some cases, the system comprises an array of command components that routes the energy source.

In some cases, the battery replacement process uses a FIFO configuration cartridge swapping system. In some cases, the cartridge swapping system that uses three stack compartments. In some cases, the logical order of the swapping process for an unmanned aerial vehicle.

The subject matter discloses a method for replacing a battery for a first vehicle, comprising: a second vehicle placing the battery above the first vehicle; releasing the battery from the second vehicle to an inlet in the first vehicle; carrying the battery in a compartment of the first vehicle; coupling the battery to electronic circuitry in the first vehicle, such that the electronic circuitry receives electronic power from the battery.

In some cases, the method further comprising receiving a request to replace the battery and sending the second vehicle to the first vehicle. In some cases, the method further comprising releasing an empty battery from the first vehicle. In some cases, releasing the empty battery via an inlet located in a bottom section of the second vehicle when the second vehicle is located under the first vehicle and while both the first vehicle and the second vehicle move.

In some cases, the method further comprising moving the empty battery from a second compartment in the first vehicle, wherein the electronic circuitry receives electronic power from the second battery when the empty battery is located in the second compartment to a third compartment in which the empty battery is stored before the empty battery is released from the first vehicle.

In some cases, the method further comprising collecting the battery in a first compartment in the first vehicle and moving the battery to a second compartment in the first vehicle, wherein the electronic circuitry receives electronic power from the battery when the battery is located in the second compartment.

In some cases, replacing the battery while both the first vehicle and the second vehicle move.

In some cases, at least one of the first vehicle and the second vehicle is an aerial vehicle.

The subject matter also discloses a vehicle, comprising a body; electronic circuitry located inside the body configured to perform tasks assigned to the aerial vehicle; a battery compartment for carrying a battery used to provide power to the electronic circuitry; an aperture located in an upper section of the body for receiving a battery, said aperture enables passage of the battery to the battery compartment.

In some cases, the vehicle further comprising a collection interface located in the upper section of the body for collecting the battery, said collection interface has variable slopes guiding the battery into the body of the aerial vehicle.

In some cases, the vehicle further comprising a secondary compartment for storing batteries after use, wherein the second compartment is located under the battery compartment.

In some cases, at least one of the secondary compartment and the battery compartment comprises a mechanism for enabling and disabling movement of the battery from one compartment to the other. In some cases, the vehicle further comprising a processor for controlling the mechanism thereby controlling the movement of the battery from one compartment to the other. In some cases, the vehicle further comprising a power source connection mechanism for connecting and disconnecting the battery to the electronic circuitry of the first aerial vehicle. In some cases, the vehicle further comprising a battery cartridge for housing the battery; wherein the battery cartridge comprises multiple apertures arranged symmetrically; wherein multiple electrical connectors coupled to the battery are placed in the multiple apertures for transferring power from the battery to connectors of the first aerial vehicle, enabling to provide power from the battery regardless to the battery's orientation in the compartment.

The subject matter also discloses a battery replacement system, comprising: three compartments arranged in series, enabling movement of batteries from a first compartment to a second compartment and from the second compartment to a third compartment; a controller for controlling operation of the three compartments; a first docking mechanism located in the first compartment for enabling and disabling movement of the battery from the first compartment to the second compartment; a second docking mechanism located in the second compartment for enabling and disabling movement of the battery from the second compartment to the third compartment; each of the three compartments comprise a power source connection mechanism for enabling and disabling transfer of power from a battery when located in each of the three compartments.

In some cases, the power source connection mechanism comprises a connector configured to transfer the power from the battery; an actuator for moving the connector towards the battery upon receiving a command from the controller. In some cases, the connector is coupled to a drawer-like component, wherein the drawer-like component carries a flat member having a flat bottom surface located in the drawer-like component and teeth on an upper part of the flat member; wherein the power source connection mechanism comprises a cogwheel coupled to the actuator, the cogwheel is placed on the teeth of the flat member, such that the actuator generates rotational movement of the cogwheel, the rotational movement of the cogwheel generates lateral movement of the flat member which moves the connector towards or away from the battery. In some cases, the actuator is a servo motor.

The subject matter also discloses a battery apparatus, comprising: a battery; a cartridge covering the battery, the cartridge comprising: a main body, top lid and a bottom lid; multiple pairs of connectors, each pair comprises a positive connector and a negative connector; wherein the multiple pairs of connectors are arranged symmetrically.

In some cases, the battery apparatus further comprising a main electrical cord coupled on one end to the battery and on another end splits to multiple secondary cords, one of the multiple secondary cords is coupled to connectors located near the top lid and a second secondary cord multiple secondary cords is coupled to connectors located near the bottom lid.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The subject matter described herein discloses a system and method for replacing a battery in a vehicle. The vehicle may be an aerial vehicle, a robot, a car, a truck, a train, a bus, a motorcycle, a bicycle, and every other vehicle having a battery. The method may be performed while the vehicle moves. The method requires a second vehicle carrying the replacing battery and delivering the battery to the first vehicle. In some cases, a second vehicle carries the replacing battery, and a third vehicle delivers the battery to the first vehicle. The second vehicle may collect the old battery also defined as a replaced battery, from the vehicle. The vehicle may remain moving, for example traveling or flying, during the battery replacement process. In some cases, the voltage provided to the vehicle's components is not lower than a threshold during the battery replacement process.

Figure 1A:
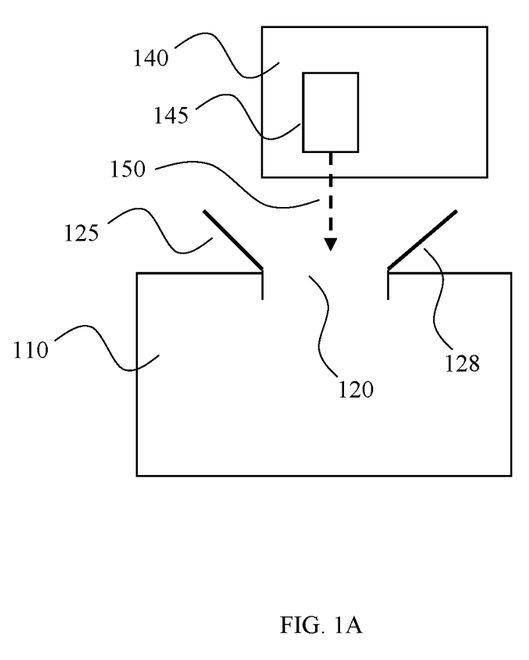
FIG. 1A shows a first vehicle receiving a battery from a second vehicle located above the first vehicle, according to exemplary embodiments of the invention.

FIG. 1A shows a first vehicle receiving a battery from a second vehicle located above the first vehicle, according to exemplary embodiments of the invention. The second vehicle 140 may be a drone, or another aerial vehicle, flying or hovering over the first vehicle 110. The second vehicle may comprise multiple batteries, such as battery 145, used to replace another battery operating in the first vehicle 110.

The second vehicle 140 may receive a request to provide the battery 145 directly from the first vehicle 110, or from a third party, such as another vehicle or a server communicating with the second vehicle 140. The vehicles 110, 140 may have a wireless communication unit enabling exchange of wireless signals, for example via a cellular network, satellite communication, radio signals or via the internet. The wireless communication units may enable the first vehicle 110 to issue a request for battery and also send the location of the first vehicle 110.

When the battery replacement is done while both vehicles 110, 140 are in motion, the second vehicle 140 may release the battery 145 while considering the velocities and the movement characteristics of both vehicles 110, 140. The battery is released downwards, as shown in arrow 150. The distance between the vehicles 110, 140 when releasing the battery 145 may be in the range of 0.5-200 meters.

The battery 145 is released from the second vehicle 140 in order to enter the first vehicle 110 from the upper section of the first vehicle 110. The first vehicle 110 comprises an aperture 120 that enables the battery 145 to enter therethrough. The aperture 120 has at least the size of the battery 145. In some cases, the first vehicle 110 also comprises a conic structure, acting as a guide to the battery 145 when falling on the upper section of the first vehicle 110. The conic structure may be formed of rigid surfaces 125, 128 forming an angle towards the aperture 120.

Figure 1B:
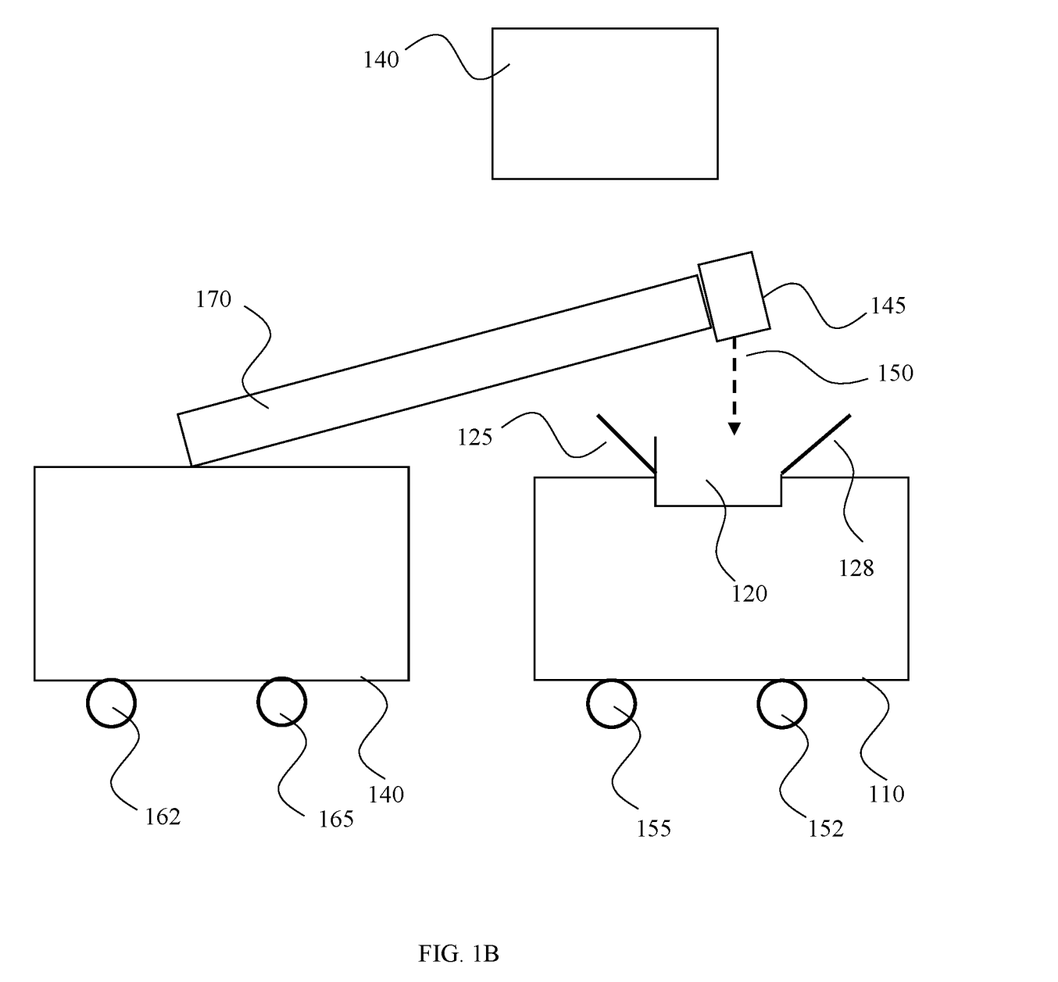
FIG. 1B shows a first vehicle receiving a battery from a second vehicle located at substantially the same height as the first vehicle, according to exemplary embodiments of the invention.

FIG. 1B shows a first vehicle receiving a battery from a second vehicle located at substantially the same height as the first vehicle, according to exemplary embodiments of the invention.

For example, the first vehicle 110 and the second vehicle 140 may be cars or motorcycles. In some other cases, the second vehicle 140 may be a train wagon and the first vehicle 110 is a train engine. The second vehicle 140 carries a battery 145. The second vehicle 140 also comprises a mechanism 170 for moving the battery 145 until the battery 145 is located above the aperture 120 of the first vehicle 110. The mechanism 170 may be an arm coupled on one end to the body of the first vehicle 110. The mechanism 170 may comprise a controlled release mechanism for releasing the battery 145. When voltage is injected into the distal end of the mechanism 170, the battery 145 is released and falls into the aperture 120 of the first vehicle 110.

Figure 2:
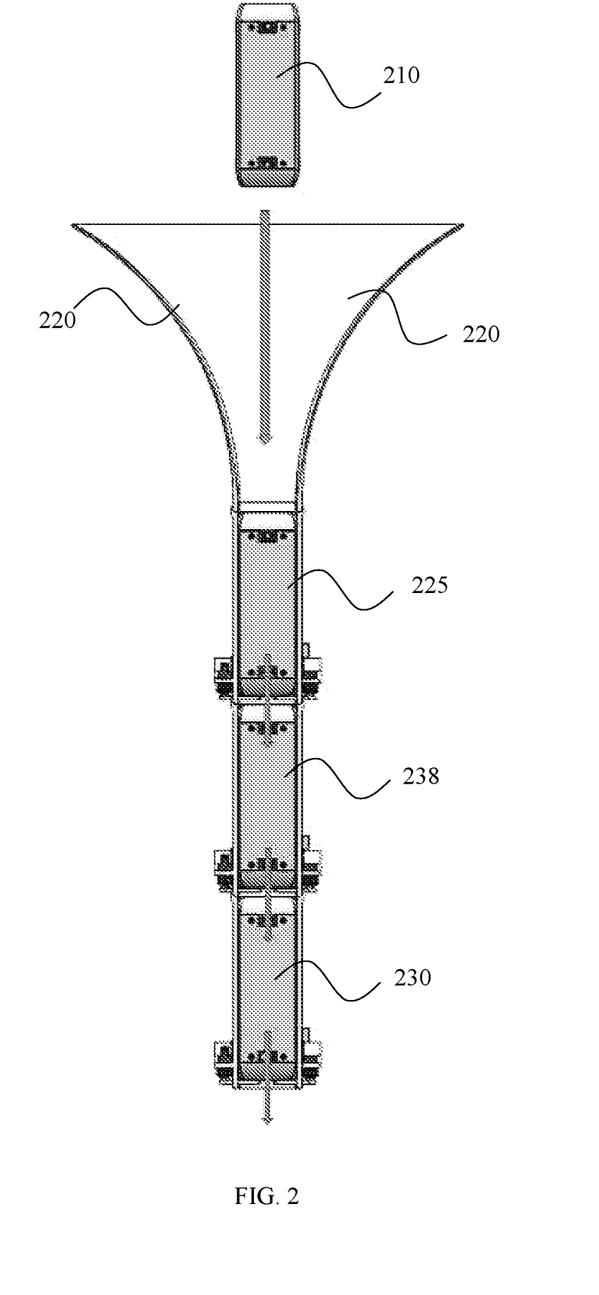
FIG. 2 shows a battery falling into a guide in an upper section of a first vehicle, according to exemplary embodiments of the invention.

FIG. 2 shows a battery falling into a guide in an upper section of a first vehicle, according to exemplary embodiments of the invention. The battery 210 is released from a second vehicle providing the battery to the first vehicle. The battery 210 is configured to slide into a battery compartment 230 in the first vehicle. When the battery 210 is located in the battery compartment 230, the battery 210 can provide power to electrical components of the first vehicle, such as an engine, motor, sensors, processors, communication units, illumination units and the like.

The battery 210 may fall on surfaces 220 that form guiding mechanism for guiding the battery 210 into the body of the first vehicle. The battery may fall downwards via passageway 225 into battery compartment 230.

Figure 5A:
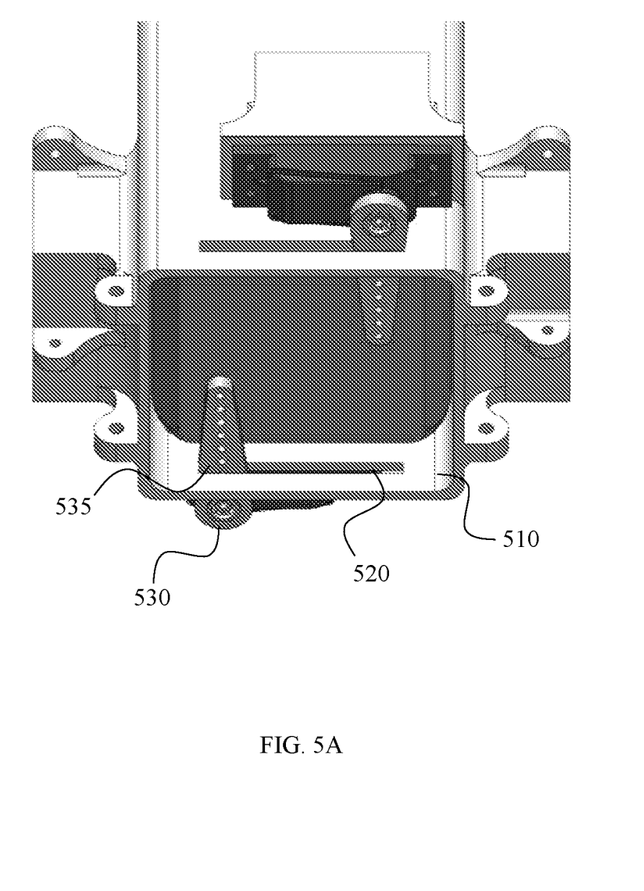
FIGS. 5A-5B show a docking mechanism of a compartment for using a replaceable battery in a vehicle, according to exemplary embodiments of the invention.
Figure 5B:
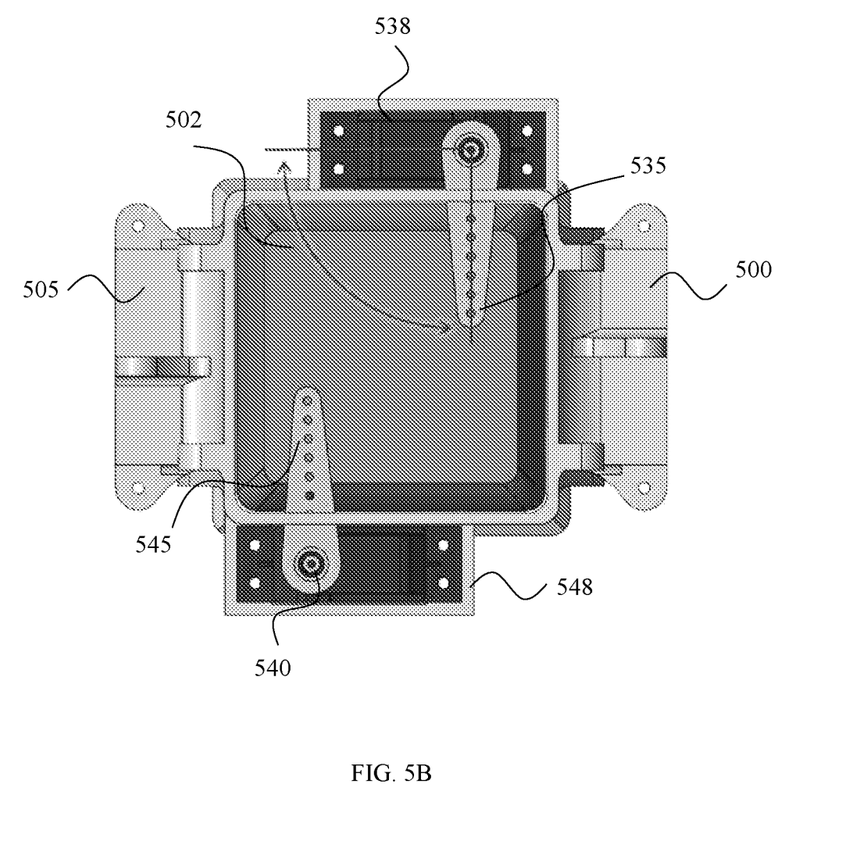

In some exemplary cases, the first vehicle comprises multiple compartments used to store batteries. When the battery is located in the battery compartment 230, the battery provides electrical power to the vehicle's components. The vehicle may comprise a pending compartment 238 for using the battery 210 before the battery enters the battery compartment 230. The pending compartment 238 may be located above the battery compartment 230, such that the battery 210 falls downwards from the pending compartment 238 to the battery compartment 230. The pending compartment 238 may comprise a docking mechanism for enabling and disabling passage of the battery 210 from the pending compartment 238 to the battery compartment 230, as shown in FIGS. 5A and 5B. The vehicle may also comprise a secondary compartment for storing the battery after use. The secondary compartment may be located under the battery compartment 230. The secondary compartment may be coupled to a bottom aperture in the bottom section of the vehicle. The empty battery may be released from the vehicle via the bottom aperture.

The first vehicle comprises a switching system coupled to the three compartments 230, 238 and 225. The switching system comprises a first unit connected to the upper and middle compartments, a second unit is connected to the middle and lower compartments and the input of the third unit is connected to the output ports of the two. The switching system has three operation modes. The first mode is absorption readiness in which docking servos are drawn in battery stop mode and connection servos retract the connector outside from the compartment and awaits to be connected. The second mode is a receive mode, in which Battery cartridge enters to the cell, connection servos extend at the command to accomplish the electrical connection and the input power to the vehicle switches to this cell. The third mode is Disconnect Mode, in which connection servos retract as the power switches away from the cell and the docking servos retract for the cartridge disposal.

The first vehicle may comprise multiple battery compartments, located one on top of the other, such that a battery may fall from the passageway 220 into the upper compartment 225, and from the upper compartment 225, to the battery compartment 230. In some cases, when the battery 210 falls into the upper compartment 225, the first vehicle contains another battery that already provided electrical power to the first vehicle's components.

Figure 3:
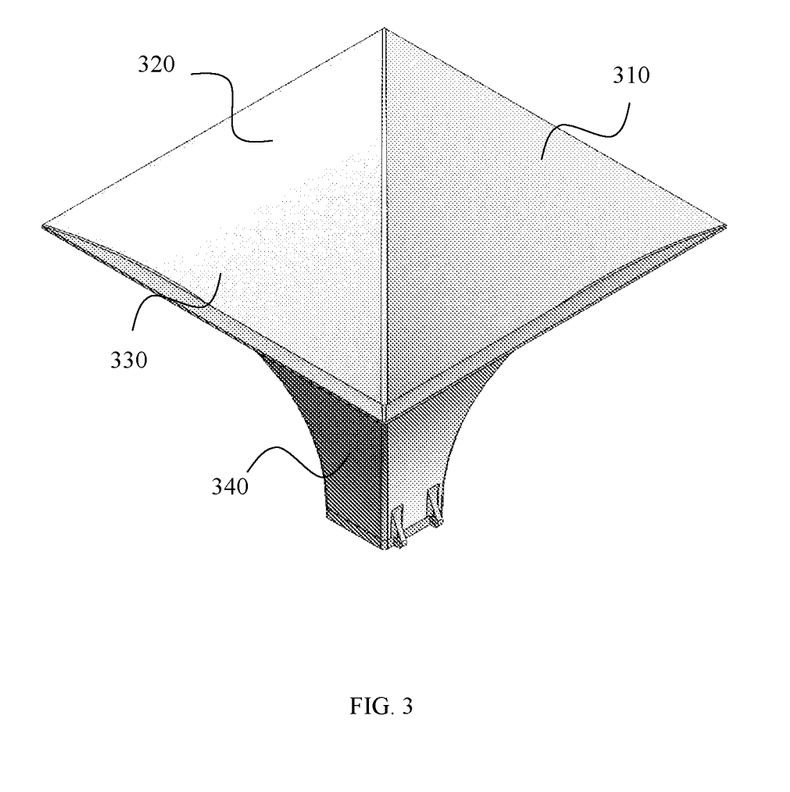
FIG. 3 shows a guiding mechanism for replacing a battery in a vehicle, according to exemplary embodiments of the invention.

In some exemplary cases, the first vehicle runs checks on the battery 210 before the new battery enters the battery compartment 230, for example when the replacing battery is in the upper compartment 225. Such checks may be based on images of the battery 210, battery's temperature, battery's power provisioning and the like. In some cases, the compartments have mechanisms that enable or disable passage of the battery 210 downwards, to the battery compartment 230. FIG. 3 shows a guiding mechanism for replacing a battery in a vehicle, according to exemplary embodiments of the invention. The guiding mechanism is located in an upper section of the vehicle receiving the new battery. The guiding mechanism comprises surfaces such as surfaces 310, 320, 330, forming a funnel narrowing downwards. The funnel is coupled to a passageway 340 leading the new battery to the battery compartment.

The guiding mechanism is configured to absorb the incoming new battery cartridge from the second vehicle and to arrange the new battery cartridge orientation to match with the shape of the passageway 340. In some exemplary cases, the shape of the funnel may be defined as having a variable angle with an increasing slope, thereby increasing the speed of the battery's cartridge when sliding downwards towards the passageway 340 leading the new battery to the battery compartment. As soon as the cartridge hits any of the compartment four sides the cartridge aligns with one of its edges by the force of gravity, then the cartridge enters one of the vehicle's compartments.

Figure 4:
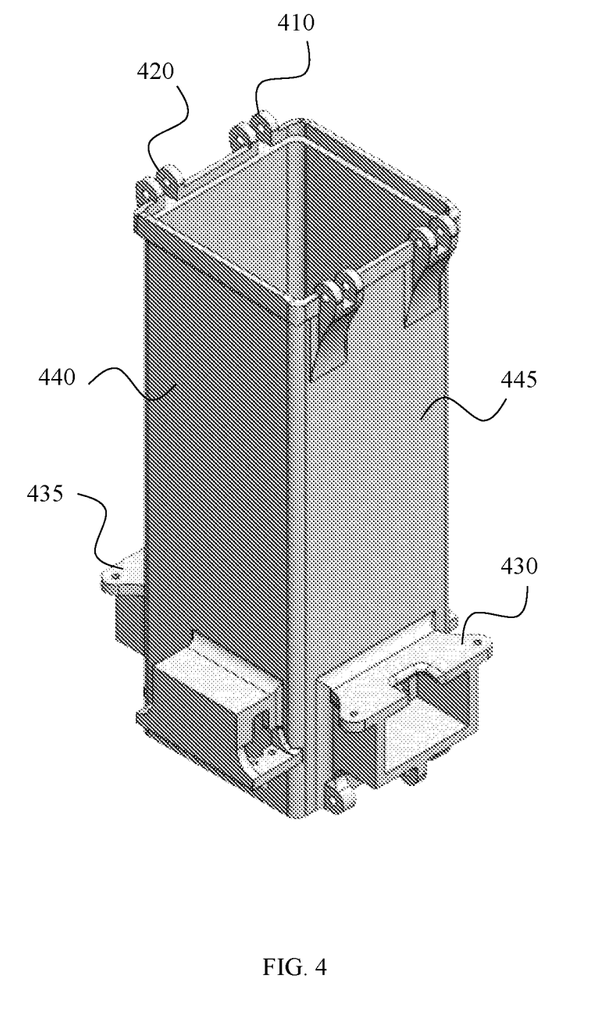
FIG. 4 shows a compartment for using a replaceable battery in a vehicle, according to exemplary embodiments of the invention.

FIG. 4 shows a compartment for using a replaceable battery in a vehicle, according to exemplary embodiments of the invention. The compartment comprises sidewalls 440, 445 forming the volume in which the battery is used to provide power to the vehicle's components. The compartment's size and shape are configured to match to the size and shape of the battery, or the battery's housing. The compartment may be a pending compartment or a battery compartment, as explained above. The compartment may also comprise one or more connectors 410, 420 configured to couple the compartment to the vehicle's body, for example using screws. The compartment comprises a protrusion 430 secures the compartment to the mechanism that transfers the power from the battery to the vehicle's components.

The vehicle may comprise a single compartment, which is the battery compartment. In such case, the vehicle first releases the empty battery, making room in the battery compartment for the new battery. In this case, the vehicle may comprise a secondary battery, providing electrical power to the vehicle's components when the battery compartment is empty.

In some other cases, the vehicle comprises two compartments, the battery compartment and a pending compartment, in which a battery waits until the empty battery is released from the battery compartment. In some other cases, the vehicle comprises three compartments—the battery compartment, the pending compartment and a release compartment, in which the empty battery is placed before the empty battery is released from the vehicle. In some exemplary cases, each of the three compartments comprises a docking mechanism that enables or disables movement of the batteries between the compartments. For example, the battery can move from the pending compartment to the battery compartment, and from the battery compartment to the release compartment. Each compartment may also comprise a power source connection mechanism that enables to couple a battery to the vehicle's components.

The empty battery can be released via a release aperture located in the bottom section of the vehicle. In case the vehicle is an aerial vehicle, the second vehicle which provided the new battery to the first vehicle may fly under the first vehicle to collect the empty vehicle falling from the release aperture. In some cases, the empty battery may be secured to a gripping mechanism coupled to the body of the first vehicle. The gripping mechanism secures the empty battery until the empty battery is secured to the second vehicle.

FIGS. 5A-5B show a docking mechanism of a compartment for using a replaceable battery in a vehicle, according to exemplary embodiments of the invention. FIG. 5A shows a side view of the compartment when the docking mechanism prevents passage of the battery downwards. The docking mechanism comprises at least one arm coupled to the compartment's body. The arm is movable, for example using an actuator coupled to the arm. The arm may have a proximal part 530 and a distal part 535. The arm's movement may be circular, as the proximal part 530 is secured to the compartment's body, and the distal part 535 moves freely. The compartment may comprise a groove 520 making room for the distal part 535 when enabling passage of the battery to another compartment. The compartment may comprise multiple arms, or another implementation for enabling and disabling passage of the battery from the compartment, as desired by a person skilled in the art.

FIG. 5B shows a bottom view of the compartment. The bottom view shows a battery located between the sidewalls and two protrusions 500, 505 for securing the compartment to the vehicle's body. The two protrusions 500, 505 may be located on opposite sides of the compartment. The docking mechanism comprising two arms. The first arm has proximal part 530 and a distal part 535 and the second arm has proximal part 540 and a distal part 545. When the distal parts 535 and 545 are located in housings 538 and 548, respectively, the battery can move away from the compartment. When the distal parts 535 and 545 are located in the battery 502, the battery cannot move away from the compartment.

Figure 6A:
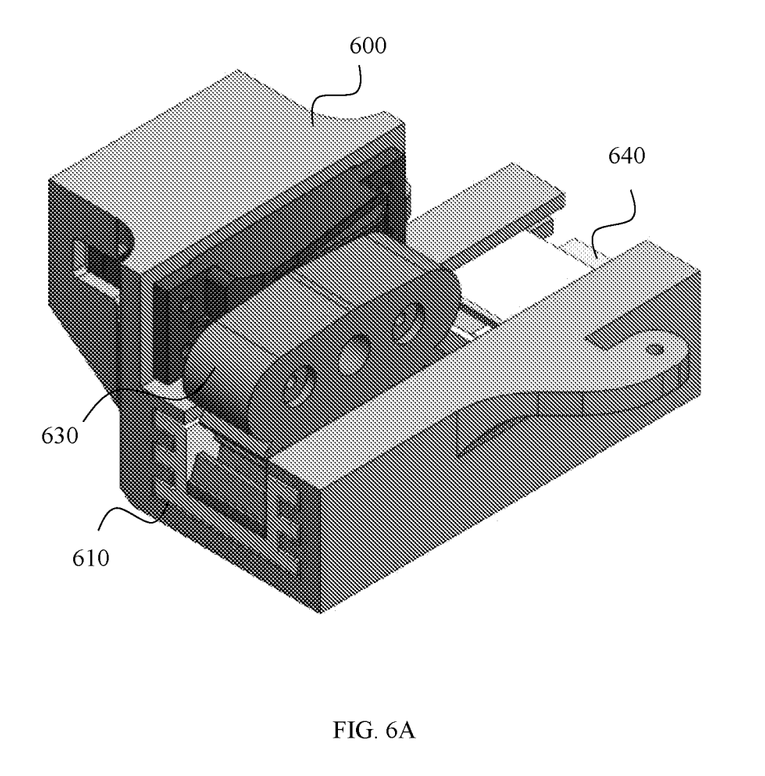
FIGS. 6A-6B show a power source connection mechanism for enabling a replaceable battery to provide electrical power to components of a vehicle, according to exemplary embodiments of the invention.
Figure 6B:
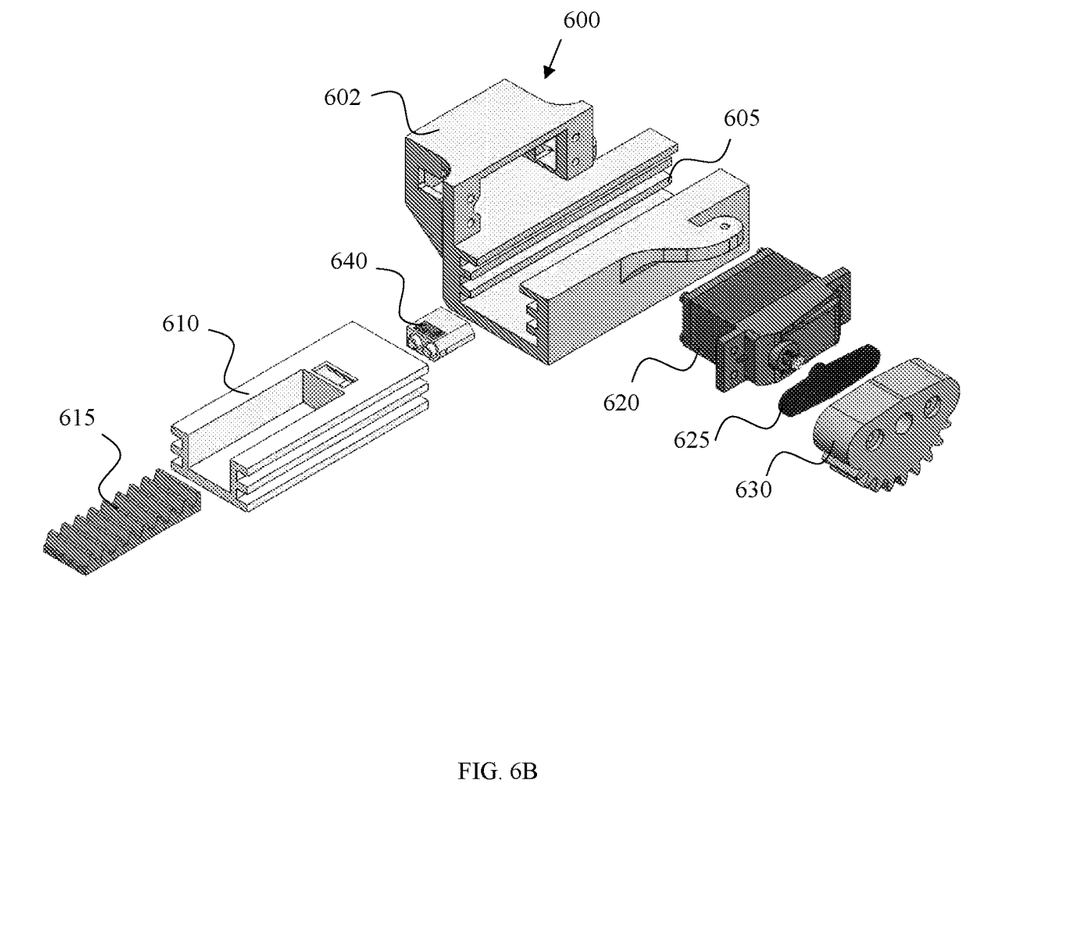

FIGS. 6A-6B show a power source connection mechanism for enabling and disabling a replaceable battery to provide electrical power to components of a vehicle, according to exemplary embodiments of the invention. In some exemplary cases, the vehicle's compartment which may carry a battery may be coupled to a single power source connection mechanism. In some other cases, the compartments may be coupled to two or more power source connection mechanisms. The power source connection mechanisms are designed to transfer electrical power to the vehicle's components, such as processor or a controller, motor, sensors, and the like. The power source connection mechanism described below is exemplary only, and other configurations of mechanisms for providing power are also included in the scope of the subject matter.

Figure 7A:
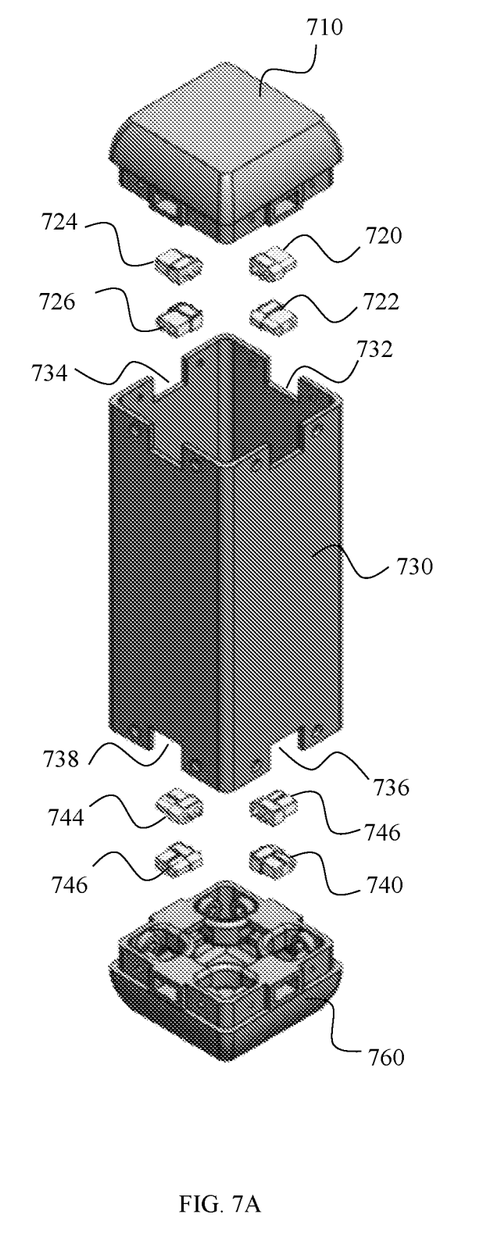
FIG. 7A-7B shows a cartridge of a replaceable battery providing electrical power to components of a vehicle, according to exemplary embodiments of the invention.
Figure 7B:
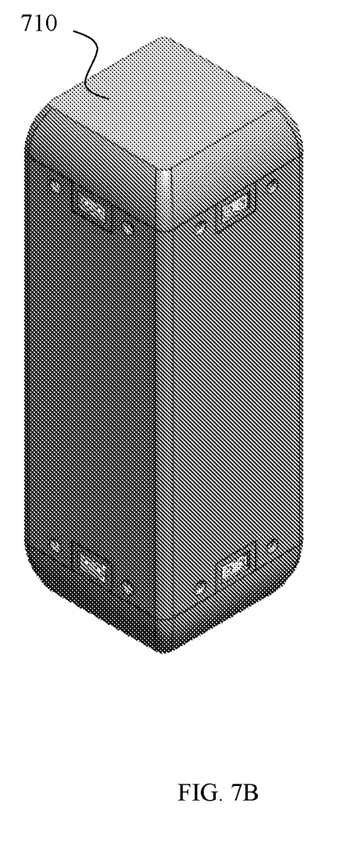

The power source connection mechanism 600 comprises a body 602. The body 602 comprises a connector for coupling the body 602 to the compartment in which the battery is carried. The body 602 further comprises a mechanical track 605 used to guide a movement of a drawer-like component 610 pushing a connector 640 towards the connectors of battery cartridge as shown in FIGS. 7A-7B. The drawer-like component 610 has a size and shape matching the mechanical track 605, for example grooves of the mechanical track 605.

The power source connection mechanism 600 comprises an actuator 620 that generates movement which results in movement of the connector 640 towards the battery. The actuator 620 may be an engine, a servo, or any actuator selected by a person skilled in the art. The actuator 620 is coupled to a cogwheel 630 via actuator head 625. The actuator 620 generates rotational movement of cogwheel 630. The cogwheel 630 comprises teeth which are placed in grooves of the flat member 615. The flat member 615 has a flat bottom surface located in the drawer-like component 610 and teeth on its upper part. The teeth enable the flat member 615 to move with the drawer-like component 610 when the cogwheel 630 moves. This way, the rotational movement generated by the actuator 620 results in a rotational movement of the cogwheel 630, which is then converted into linear movement of the drawer-like component 610, which pushes the connector 640 towards the battery.

When there is need to transfer power from the battery, the actuator 620 generates movement of the cogwheel 630, which moves the flat member 615 inside the drawer-like component 610, pushing the drawer-like component 610 inside the mechanical track 605. The connector 640 is fixed to the drawer-like component 610, such that movement of the flat member 615 pushes the connector 640 towards the battery.

FIG. 7 shows a cartridge of a replaceable battery providing electrical power to components of a vehicle, according to exemplary embodiments of the invention.

The cartridge comprises a top lid 710 and a bottom lid 760. The top lid 710 and the bottom lid 760 may be of an identical shape, to enable coupling of the battery regardless to the cartridge's orientation in the battery compartment. The outer surface shape of the lids 710, 760 may be constructed as a pair of perpendicular half cylinders. This imparts smooth movement to the cartridge at the end of the guiding compartment. The cartridge also comprises a main part 730 coupled on one end to the top lid 710 and on the other end to the bottom lid 760.

The connectors may be placed in the area where the lids 710, 760 are connected to the main part 730. In FIG. 7, the cartridge comprises two pairs of 4 connectors, a total of eight connectors. Four connectors 720, 722, 724 and 726 are located in the top lid 710 and the main part 730. Similarly, four connectors 742, 744, 746 and 748 are located in the bottom lid 760 and the main part 730. The main part 730 may comprise niches for enabling connectors transferring electrical current from the battery to flow out of the cartridge, to be coupled to the vehicle's components. For example, the top part of the main part 730 has four niches, such as niches 732 and 734 and the bottom part of the main part 730 has four niches, such as niches 736 and 738.

In some cases, the distance between the upper end of the cartridge to the upper connectors 720, 722, 724 and 726 is equal to the distance between the bottom end of the cartridge and the bottom connectors 742, 744, 746 and 748. In some cases, the main part 730 is coupled to the top lid 710 in a male-female configuration, secured with screws. In some cases, the main part 730 is coupled to the bottom lid 760 in a male-female configuration, secured with screws.

In some exemplary cases, each of the upper connectors 720, 722, 724 and 726 and the bottom connectors 742, 744, 746 and 748 comprise a pair of connectors, a positive connector and a negative connector, to enable placing the battery in any orientation.

Figure 8:
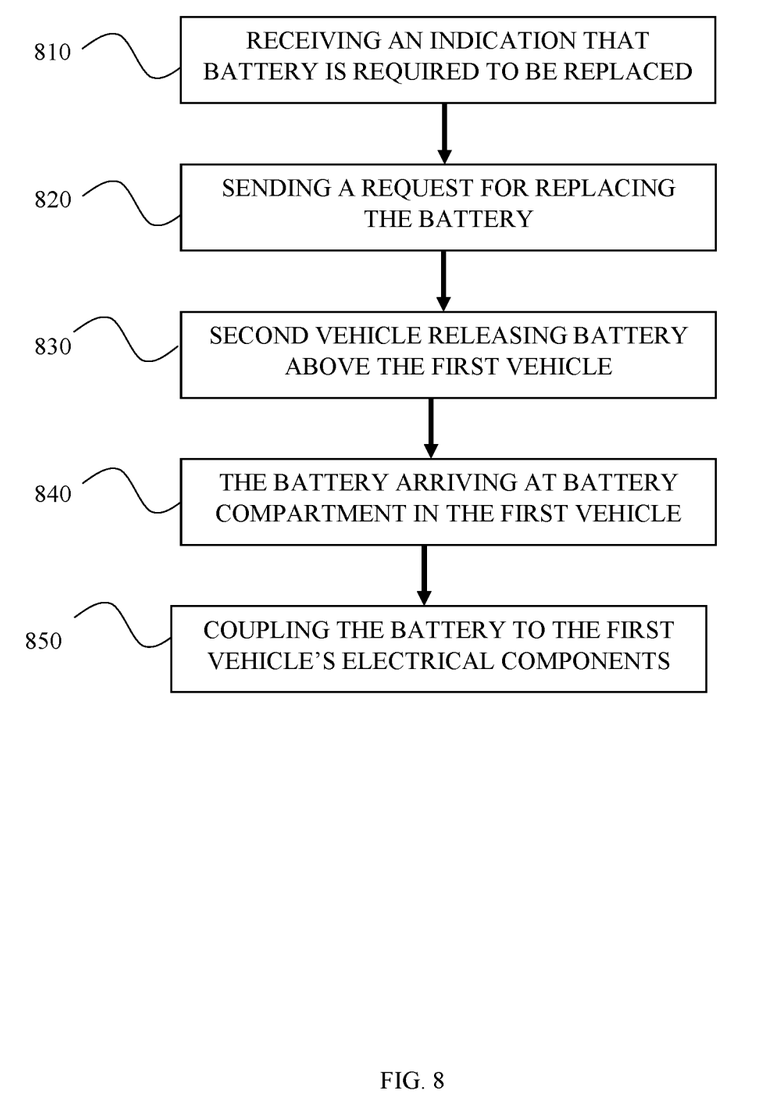
FIG. 8 shows a method for replacing a battery in a vehicle, according to exemplary embodiments of the invention.

In some exemplary cases, the main electrical cord of the cartridge is designed to allow a parallel connection between the individual port of the battery towards each one of the connection points of the cartridge. the main electrical cord splits from the battery port towards the top lid 710 and the bottom lid 760. The secondary electrical cord splits from each lid to each of the connectors. The secondary electrical cord is designed to enable disassembly of the cartridge and disconnect each of the covers regardless of any other factor, thereby remove the entire battery from the cartridge, for example for charging and control purposes. Since the battery is asymmetrical in size, the main electrical cord will be on the narrow side of the battery. FIG. 8 shows a method for replacing a battery in a vehicle, according to exemplary embodiments of the invention.

Step 810 discloses receiving an indication that battery is required to be replaced. The indication may be provided from electrical circuitry coupled to the battery and detecting the voltage or current provided by the battery. The indication may be sent to a processor in the vehicle.

Step 820 discloses sending a request for replacing the battery. The request may be sent to a server or to another vehicle. The request may include the vehicle's location or an expected location, for example an estimated location of the vehicle 12 minutes after sending the request. The vehicle's location may be sent frequently, for example once every 0.1 seconds, and both vehicles may compute the expected battery supply location. The request may be sent over a wireless channel, for example a cellular network, satellite communication, radio signals, Wi-Fi and the like.

Step 830 discloses second vehicle releasing battery above the first vehicle. The second vehicle may be located above the first vehicle. In some other cases, the second vehicle is located at substantially the same height as the first vehicle. The battery may be released from an aperture located in the bottom part of the second vehicle. The battery may be carried by a mechanism, such as an arm, coupled to the body of the second vehicle, when released from the second vehicle. The release may take place in response to receiving a signal from the first vehicle.

Step 840 discloses the battery arriving battery compartment in the first vehicle. The battery is released onto the upper part of the first vehicle. The battery is guided via guiding mechanism downwards, into the battery compartment. In some cases. The battery first arrives at pending compartment, and falls from the pending compartment to the battery compartment only afterwards, when the empty battery is removed from the battery compartment.

Step 850 discloses coupling the battery to the first vehicle's electrical components. The coupling may be performed by connecting the connectors of the battery to connectors having a wired coupling with the first vehicle's electrical components.

Figure 9:
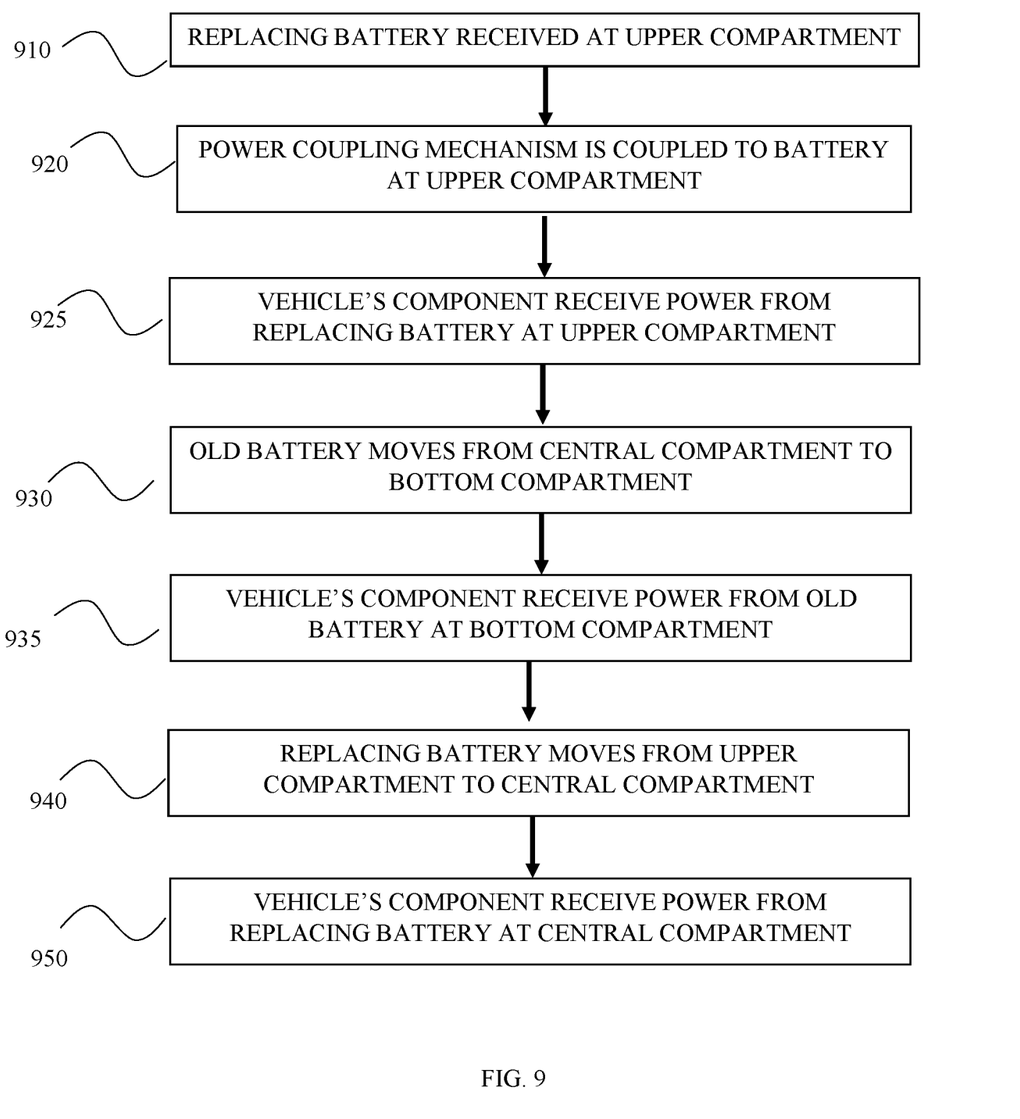
FIG. 9 shows a method for replacing a battery in a vehicle while maintaining continuous power supply to the vehicle's components, according to exemplary embodiments of the invention.

FIG. 9 shows a method for replacing a battery in a vehicle while maintaining continuous power supply to the vehicle's components, according to exemplary embodiments of the invention. The method requires that the vehicle has three compartments, an upper compartment, a central compartment and a bottom compartment, and the batteries can move from the upper compartment to the central compartment and from the central compartment to the bottom compartment. This way, at all times, at least one of the old battery or the replacing battery supply power to the vehicle's components.

Step 910 discloses replacing battery received at upper compartment. The replacing battery, also defined as the new battery, is provided from another vehicle. The replacing battery enters the vehicle via an aperture, and transferred to the upper compartment.

Step 920 discloses power source connection mechanism is coupled to battery at upper compartment. Each of the three compartments comprise a separate power source connection mechanism that enables to couple the vehicle's components to the battery located in each compartment. Thus, the power source connection mechanism receives a command to be coupled to the battery. An actuator of the power source connection mechanism begins operating, and the replacing battery, located in the upper compartment, is coupled to the vehicle's components.

Step 925 discloses vehicle's component receive power from replacing battery at upper compartment. When the power source connection mechanism is coupled to the replacing battery, the replacing battery provides power when located in the upper compartment.

Step 930 discloses old battery moves from central compartment to bottom compartment. Each of the compartments comprise a docking mechanism that enables or disables the batteries' movement from the upper compartment to the central compartment and from the central compartment to the bottom compartment (by gravitational forces). Once the replacing battery supplies power to the vehicle's components at the upper compartment, the vehicle's processor sends a command to the docking mechanism to enable the old battery to move downwards, from the central compartment to the bottom compartment. The docking mechanism can then move an arm that locks the old battery from moving downwards, and the old battery moves to the bottom compartment.

Step 935 discloses vehicle's component receive power from old battery at bottom compartment. After receiving an indication that the old battery is located in the bottom compartment, the vehicle's processor sends a command to the power source connection mechanism of the bottom compartment to be coupled to the old battery. The power source connection mechanism is then coupled to the old battery, and the old battery supplies power to the vehicle's components.

Step 940 discloses replacing battery moves from upper compartment to central compartment. Once the old battery supplies power to the vehicle's components, the replacing battery can move to the central compartment. first, the power source connection mechanism of the top compartment is decoupled from the replacing battery. Then, the docking mechanism of the top compartment enables the replacing battery to move downwards to the central compartment.

Step 950 discloses vehicle's component receive power from replacing battery at central compartment. When the replacing battery is received at the central compartment, the vehicle's processor sends a command to the power source connection mechanism of the central compartment to be coupled to the replacing battery. This way, the replacing battery provides power to the vehicle's components. Then, the power source connection mechanism of the bottom compartment is decoupled from the old battery, and the old battery can be removed from the first vehicle.

Figure 10A:
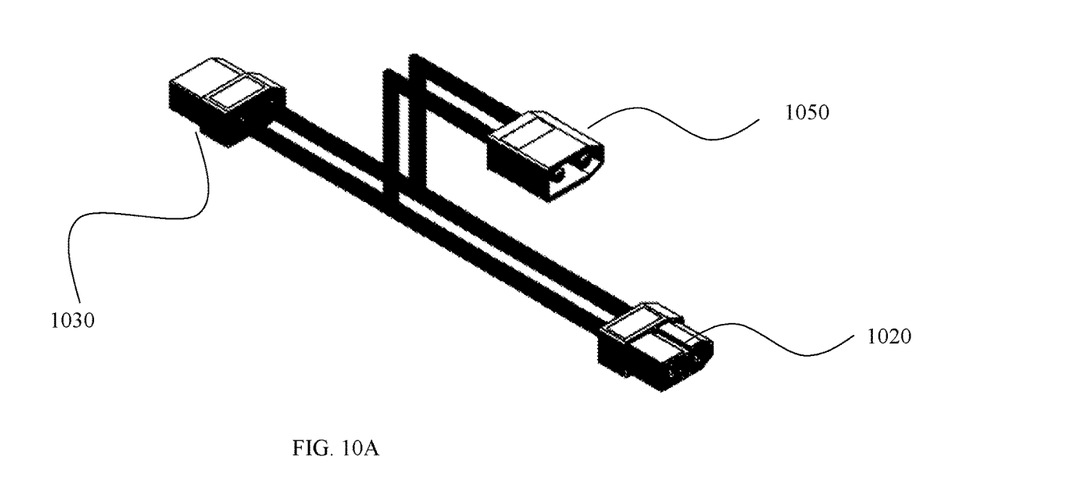
FIGS. 10A and 10B show electrical circuitry coupling the battery to the connectors in the cartridge, according to exemplary embodiments of the subject matter.
Figure 10B:
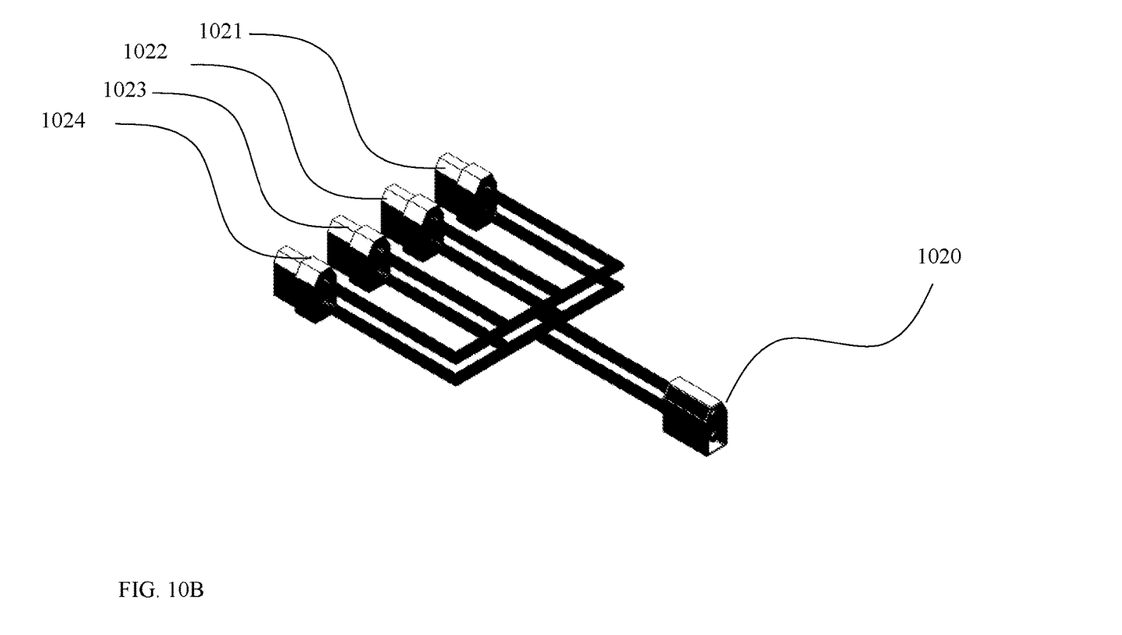

FIGS. 10A and 10B show electrical circuitry coupling the battery to the connectors in the cartridge, according to exemplary embodiments of the subject matter. In FIG. 10A, main electrical cord 1050 is coupled to two secondary electrical cords 1020, 1030. In FIG. 10B, secondary cord 1020 is coupled to connectors 1021, 1022, 1023, 1024.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the invention. To the extent that section headings are used, they should not be construed as necessarily limiting.

The invention claimed is:

1. A method for replacing an empty battery in a first vehicle, the method comprising:
   a second vehicle placing a replacement battery above the first vehicle;
   releasing the replacement battery from the second vehicle to an inlet at the first vehicle;
   using gravitation, receiving the replacement battery at a compartment at the first vehicle;
   coupling the replacement battery to electronic circuitry at the first vehicle such that the electronic circuitry receives electric power from the replacement battery; and
   releasing the empty battery from the first vehicle.

2. The method of claim 1, further comprising receiving a prior request to replace the empty battery and sending the second vehicle to the first vehicle to carry out the battery replacement.

3. The method of claim 1, wherein the empty battery is released via an outlet located at a bottom section of the first vehicle, while the second vehicle is located below the first vehicle, and while both the first and second vehicles are moving.

4. The method of claim 1, further comprising:
   providing first, second, and third battery compartments at the first vehicle;
   transferring the empty battery from the second battery compartment in the first vehicle to the third battery compartment while supplying electric power to components of the first vehicle via a secondary battery; and
   releasing the empty battery from the third battery compartment of the first vehicle to the second vehicle positioned below.

5. The method of claim 4, further comprising:
   collecting the replacement battery released from the second vehicle in the first battery compartment;
   moving the replacement battery to the second battery compartment; and
   upon placement of the replacement battery in the second battery compartment, supplying electric power to the electronic circuitry from the replacement battery.

6. The method of claim 1, wherein the battery replacement is performed while both the first and the second vehicles are in movement.

7. The method of claim 1, wherein at least one of the first and second vehicles is an aerial vehicle.

8. The method of claim 3, wherein at least one of the first and second vehicles is an aerial vehicle.

* * * * *